(No Model.)

D. L. CADY.
WEATHER STRIP.

No. 282,160. Patented July 31, 1883.

Attest:
N. P. Sprague
E. Scully

Inventor:
D. Lawton Cady.
By Thos. S. Sprague
Att'y.

UNITED STATES PATENT OFFICE.

D. LAWTON CADY, OF HOLLY, MICHIGAN.

WEATHER-STRIP.

SPECIFICATION forming part of Letters Patent No. 282,160, dated July 31, 1883.

Application filed November 8, 1882. (No model.)

*To all whom it may concern:*

Be it known that I, D. LAWTON CADY, of Holly, in the county of Oakland and State of Michigan, have invented new and useful Improvements in Weather-Strips for Doors; and I do hereby declare that the following is a full, clear, and exact description thereof, reference being had to the accompanying drawings, which form a part of this specification.

The nature of this invention relates to certain new and useful improvements in the construction and application of weather-strips to doors, where the strip is brought into perfect action by the closing of the door and released from such action by the opening of the same.

The invention consists in the peculiar construction of parts and their various combinations, as more fully hereinafter described.

Figure 1:
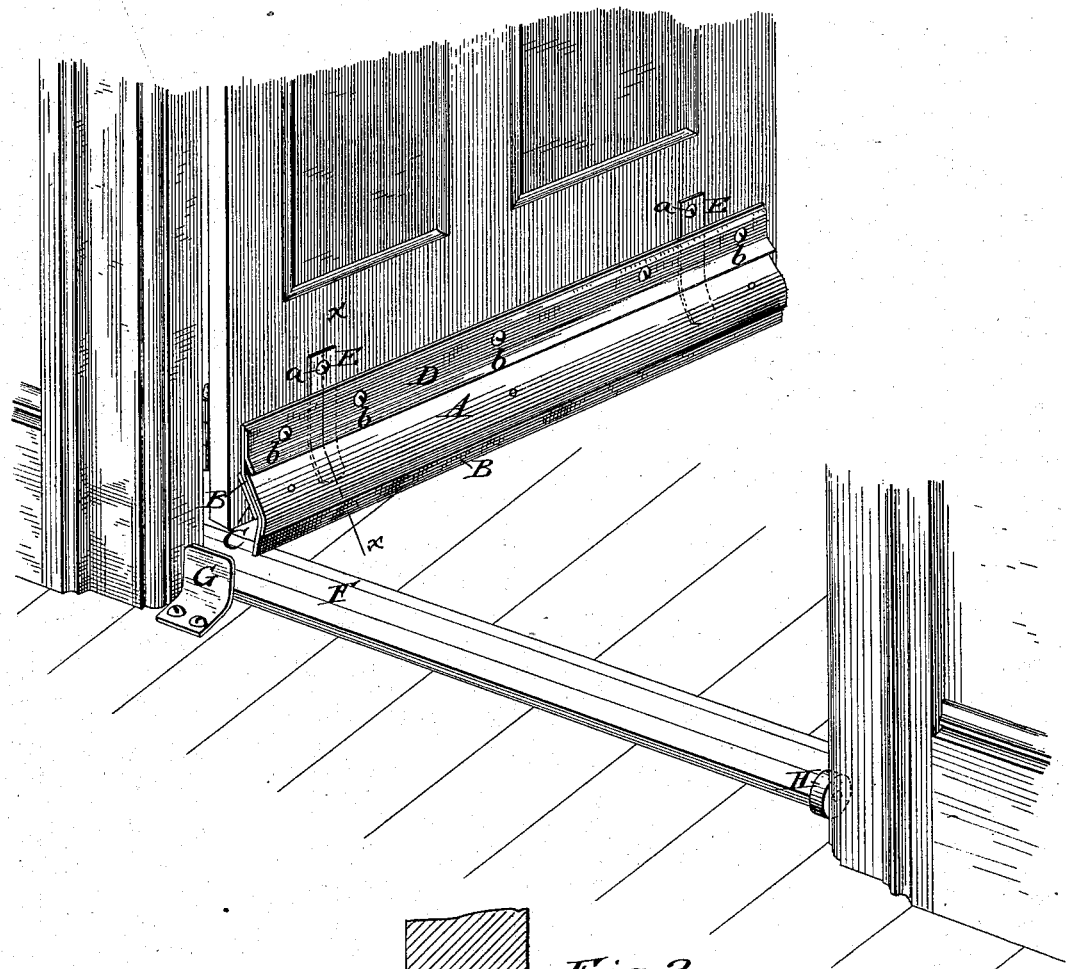
Figure 2:
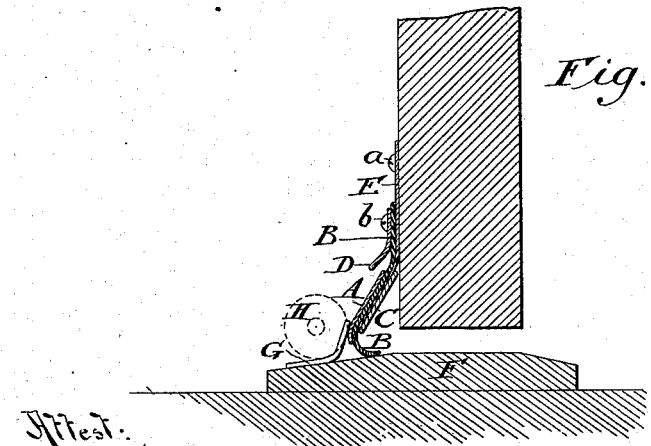

Figure 1 is a perspective view, showing a section of door partially opened, door-frame, sill, and stops. Fig. 2 is a vertical section through the line X X in Fig. 1.

In the accompanying drawings, which form a part of this specification, A represents a thin metal plate of the shape shown distinctly in the cross-section in Fig. 2.

B represents a strip of rubber cloth or other suitable material, secured between the strips A and a flat strip, C, the strip A being upon the outer and a strip, C, upon the inner side of the rubber, which latter projects below the edge of the strip A and above the edges of the strips A C. D is another strip, of the form shown in cross-section in Fig. 2, and all these strips are designed to be of the proper width for the door.

E E are strips of spring-steel, the upper ends of which are fastened to the door by means of bolts or similar devices, *a*. These strips extend downward between the strip C and the rubber strip B, nearly or quite to the lower edge of such metal strip C. Rivets or bolts *b*, passing through the metal strip D and the upwardly-projecting edge of the rubber strip B, secure the same to the door.

In practice, when the device is secured to the door as described, the springs E, when the door is opened, throw the lower edge to the front, thereby relieving nearly all of the friction of the lower edge of the rubber strip on the threshhold F, and should, from any cause, the lower edge of the device have a tendency to spring forward too much, this motion is arrested by the strip A coming in contact with the lower edge of the curved strip D, which is so situated with relation to the other parts as to allow a sufficient play to free the friction upon the threshhold. When the door is being closed, the end of this strip nearest the pivotal point of the door strikes the stop G, and thereby commences to force the strip backward, and the final closing of the door brings the opposite end of the strip into contact with the wheel-stop H, which I consider better than a rigid stop, for the reason that the moment the front of the strip strikes that wheel it compels the wheel partially to rotate in the direction of the deflection of the strip, thereby preventing the strip from being marred and very much lessening the friction.

A weather-strip constructed in this manner, with all its parts of metal except that portion which is required to be flexible, and as shown at B, will be found very serviceable, and much more lasting than the ordinary weather-strips, which are composed of wood and rubber with hinges and springs, when adapted to close the space between the bottom of the door and the top of the sill.

What I claim as my invention is—

1. A weather-strip composed of the parts A, B, C, D, and E, arranged, combined, and operating substantially as and for the purposes described.

2. In combination with a weather-strip, constructed substantially as described, the rigid stop G and the rolling stop H, substantially as and for the purposes specified.

D. LAWTON CADY.

Witnesses:
H. S. SPRAGUE,
A. BARTHEL.